(12) United States Patent
Han et al.

(10) Patent No.: US 9,883,568 B2
(45) Date of Patent: Jan. 30, 2018

(54) PROGRAMMABLE EMERGENCY LIGHTING DEVICE INCLUDING NEAR-FIELD COMMUNICATION

(71) Applicant: Hubbell Incorporated, Shelton, CT (US)

(72) Inventors: Lei Han, Greenville, SC (US); John Lane, Greenville, SC (US)

(73) Assignee: Hubbell Incorporated, Shelton, CT (US)

( * ) Notice: Subject to any disclaimer, the term of this patent is extended or adjusted under 35 U.S.C. 154(b) by 98 days.

(21) Appl. No.: 15/130,415

(22) Filed: Apr. 15, 2016

(65) Prior Publication Data

US 2016/0309570 A1    Oct. 20, 2016

Related U.S. Application Data

(60) Provisional application No. 62/148,779, filed on Apr. 17, 2015.

(51) Int. Cl.

| *H02J 1/10* | (2006.01) |
| *H02J 3/06* | (2006.01) |
| *H02J 3/46* | (2006.01) |
| *H05B 37/02* | (2006.01) |
| *H05B 33/08* | (2006.01) |
| *F21S 9/02* | (2006.01) |

(Continued)

(52) U.S. Cl.
CPC ....... *H05B 37/0272* (2013.01); *H05B 33/089* (2013.01); *H05B 33/0815* (2013.01); *H05B 33/0854* (2013.01); *H05B 33/0884* (2013.01); *F21S 9/022* (2013.01); *F21V 23/045* (2013.01); *H02J 9/061* (2013.01)

(58) Field of Classification Search
USPC ....................................................... 307/20, 66
See application file for complete search history.

(56) References Cited

U.S. PATENT DOCUMENTS

| 8,498,572 B1 | 7/2013 | Schooley et al. | |
| 9,307,621 B1 * | 4/2016 | Parello ............... | H05B 37/0272 |
| 9,629,220 B2 * | 4/2017 | Panopoulos ....... | H05B 37/0209 |

(Continued)

OTHER PUBLICATIONS

PCT/US2016/027841 International Search Report and Written Opinion dated Jul. 13, 2016.

*Primary Examiner* — Adam Houston
(74) *Attorney, Agent, or Firm* — Michael Best & Friedrich, LLP

(57) ABSTRACT

An emergency lighting unit. The emergency lighting unit includes a light source, an antenna, a near-field communication ("NFC") module, and a controller. The antenna is operable to receive a wireless communication signal. The NFC module is connected to the antenna, and the NFC module is operable to write, to a memory, information associated with the wireless communication signal. The controller is connected to the NFC module. The controller is operable to read the information associated with the wireless communication signal from the memory, set one or more system parameters of the emergency lighting unit based on the information associated with the wireless communication signal, and control the illumination of the light source based on at least one system parameter set based on the information associated with the wireless communication signal.

20 Claims, 16 Drawing Sheets

(51) Int. Cl.
    *H02J 9/06*       (2006.01)
    *F21V 23/04*      (2006.01)

(56) References Cited

U.S. PATENT DOCUMENTS

| | | | |
|---|---|---|---|
| 9,667,096 B2* | 5/2017 | Han | H02J 9/061 |
| 9,762,437 B2* | 9/2017 | Apte | H04L 41/0806 |
| 2012/0109399 A1 | 5/2012 | Tran | |
| 2012/0315843 A1 | 12/2012 | Cox | |
| 2013/0010018 A1 | 1/2013 | Economy | |
| 2013/0147376 A1* | 6/2013 | Trainor | H02J 9/065 |
| | | | 315/200 R |
| 2013/0204993 A1* | 8/2013 | Uribe-Etxebarria Jimenez | G06Q 10/10 |
| | | | 709/223 |
| 2014/0023363 A1* | 1/2014 | Apte | H04L 12/2803 |
| | | | 398/43 |
| 2014/0125133 A1* | 5/2014 | Han | H02J 7/022 |
| | | | 307/66 |
| 2014/0167912 A1 | 6/2014 | Snyder et al. | |
| 2014/0287681 A1 | 9/2014 | Ollikainen et al. | |
| 2015/0002080 A1* | 1/2015 | Lang | H02J 7/0068 |
| | | | 320/107 |
| 2015/0035437 A1* | 2/2015 | Panopoulos | F21V 14/02 |
| | | | 315/112 |
| 2015/0061541 A1 | 3/2015 | Gandini | |
| 2015/0120000 A1* | 4/2015 | Coffey | H04L 12/2803 |
| | | | 700/13 |
| 2016/0309570 A1* | 10/2016 | Han | H05B 33/0815 |
| 2016/0336797 A1* | 11/2016 | Dahlen | H05B 37/0245 |
| 2017/0098354 A1* | 4/2017 | Loeb | G08B 13/22 |
| 2017/0166067 A1* | 6/2017 | Panopoulos | B60L 11/182 |
| 2017/0190259 A1* | 7/2017 | Penilla | B60L 11/1822 |
| 2017/0206721 A1* | 7/2017 | Koo | G07C 9/00015 |
| 2017/0237471 A1* | 8/2017 | Green | H04B 5/0043 |
| | | | 315/129 |
| 2017/0238397 A1* | 8/2017 | Green | H05B 37/0272 |
| | | | 315/129 |
| 2017/0244278 A1* | 8/2017 | Luk | H05B 33/0815 |
| 2017/0250569 A1* | 8/2017 | Han | H02J 7/022 |
| 2017/0255178 A1* | 9/2017 | Logue | G05B 19/0428 |
| 2017/0263111 A1* | 9/2017 | Deluliis | G08B 21/10 |

\* cited by examiner

PROGRAMMABLE EMERGENCY LIGHTING DEVICE INCLUDING NEAR-FIELD COMMUNICATION

RELATED APPLICATIONS

The present application claims priority to U.S. Provisional Application No. 62/148,779, filed Apr. 17, 2015, the entire contents of which are hereby incorporated.

BACKGROUND

This application relates to emergency lighting equipment.

SUMMARY

Emergency lighting units or products provide illumination to individual buildings or building complexes in the event of a failure of the mains power supply. Emergency lighting units are typically used to light a path of egress, such as corridors, walkways, stairways, and exits from the premises. For example, emergency lighting units can be used to illuminate an evacuation route in the event of a power outage. Emergency lighting units detect the existence of a power outage or similar emergency condition by monitoring the mains power supply voltage and detecting when the mains voltage is inadequate to power conventional lighting. In response to a power outage or reduction (below a threshold level), emergency lighting units automatically enter an emergency mode. Emergency lighting units also typically include charging circuitry, an energy storage component (e.g., a battery) that is charged using the mains power supply during normal operation, etc.

Various emergency lighting units can have different operational and/or control system parameters and functions that are specific to the particular unit. In some embodiments, tens or dozens of different emergency lighting units may be available that differ only in operational and/or control system parameters. For example, similar emergency lighting units may vary based on battery charging parameters, LED driver parameters, dimming profiles, self-diagnostics options, self-test schedules, battery heater options, etc. A plurality of distinct printed circuit boards ("PCBs") can be designed to meet the operational and control system parameters of a specific emergency lighting unit, but such an approach increases development costs and time.

Alternatively, and as set forth with respect to this application, a common PCB design can be used for a plurality or all of the different emergency lighting units. Using the common PCB approach, system operational and/or control system parameters can be programmed or configured for each emergency lighting unit at the assembly line during production. The programming or configuration of the emergency lighting units is achieved using near-field communication ("NFC") technology.

In one embodiment, the application provides an emergency lighting unit. The emergency lighting unit includes a light source, an antenna, a near-field communication ("NFC") module, and a controller. The antenna is operable to receive a wireless communication signal. The NFC module is connected to the antenna, and the NFC module is operable to write, to a memory, information associated with the wireless communication signal. The controller is connected to the NFC module. The controller is operable to read the information associated with the wireless communication signal from the memory, set one or more system parameters of the emergency lighting unit based on the information associated with the wireless communication signal, and control the illumination of the light source based on at least one system parameter that is set based on the information associated with the wireless communication signal.

In another embodiment, the application provides a method of controlling an emergency lighting unit. The method including receiving, via a near-field communication ("NFC") module, a wireless communication signal; setting a system parameter of the emergency lighting unit based on information associated with the wireless communication signal; and controlling illumination of a light source based on the system parameter.

Other aspects of the application will become apparent by consideration of the detailed description and accompanying drawings.

DETAILED DESCRIPTION

Figure 1:
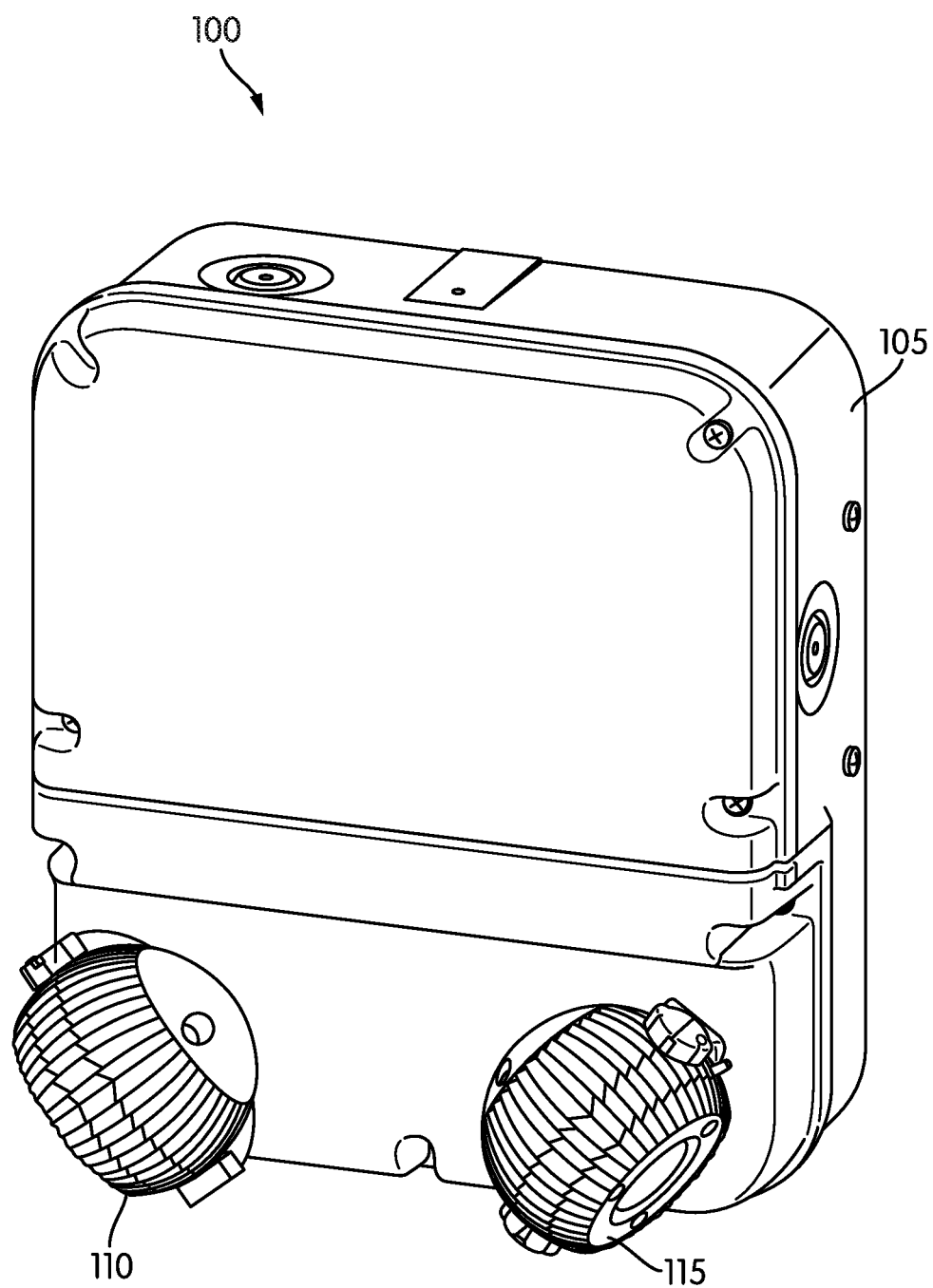
FIG. 1 is a front perspective view of an emergency lighting unit according to an embodiment of the application.

Before any embodiments of the application are explained in detail, it is to be understood that the application is not limited in its application to the details of the configuration and arrangement of components set forth in the following description or illustrated in the accompanying drawings. The application is capable of other embodiments and of being practiced or of being carried out in various ways. Also, it is to be understood that the phraseology and terminology used herein are for the purpose of description and should not be regarded as limiting. The use of "including," "comprising," or "having" and variations thereof herein are meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings.

In addition, it should be understood that embodiments of the application may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects of the application may be implemented in software (e.g., stored on non-transitory computer-readable medium) executable by one or more processing units, such as a microprocessor and/or application specific integrated circuits ("ASICs"). As such, it should be noted that a plurality of hardware and software based devices, as well as a plurality of different structural components may be utilized to implement the application. For example, "servers" and "computing devices" described in the specification can include one or more processing units, one or more computer-readable medium modules, one or more input/output interfaces, and various connections (e.g., a system bus) connecting the components.

Embodiments of the application described herein provide an emergency lighting unit, device, or product that is operable to detect an emergency condition and enter an emergency lighting mode in response to the emergency condition. However, different emergency lighting units can each have slightly, or very, different operational or control system parameters and features (e.g., each stock keeping unit ["SKU"] product is configured differently). As such, although various emergency lighting units appear to be the same or very similar, these differences in operational or control parameters and features previously necessitated a unique printed circuit board ("PCB") layout for each lighting unit, or direct wired access to a controller for programming. Designing and developing distinct PCBs for each different emergency lighting unit involves considerable development time and money. To avoid having to design unique PCBs for each lighting unit or directly programming a controller, the application provides a common PCB design that can be used for a plurality or all of the different emergency lighting units. Using a common PCB design, system operational and/or control system parameters can be programmed or configured for each emergency lighting unit during production. The programming or configuration of the emergency lighting units is achieved using near-field communication ("NFC"). NFC is a short-range wireless radio-frequency identification ("RFID") technology that operates in the 13.56 MHz ISM frequency band. The emergency lighting units are programmed by loading operational and control parameters into a memory of the emergency lighting units using a contactless data exchange enabled by NFC. A controller within the each emergency lighting unit uses the received data to set, reset, or update operational and control parameters of the emergency lighting unit.

Figure 2:
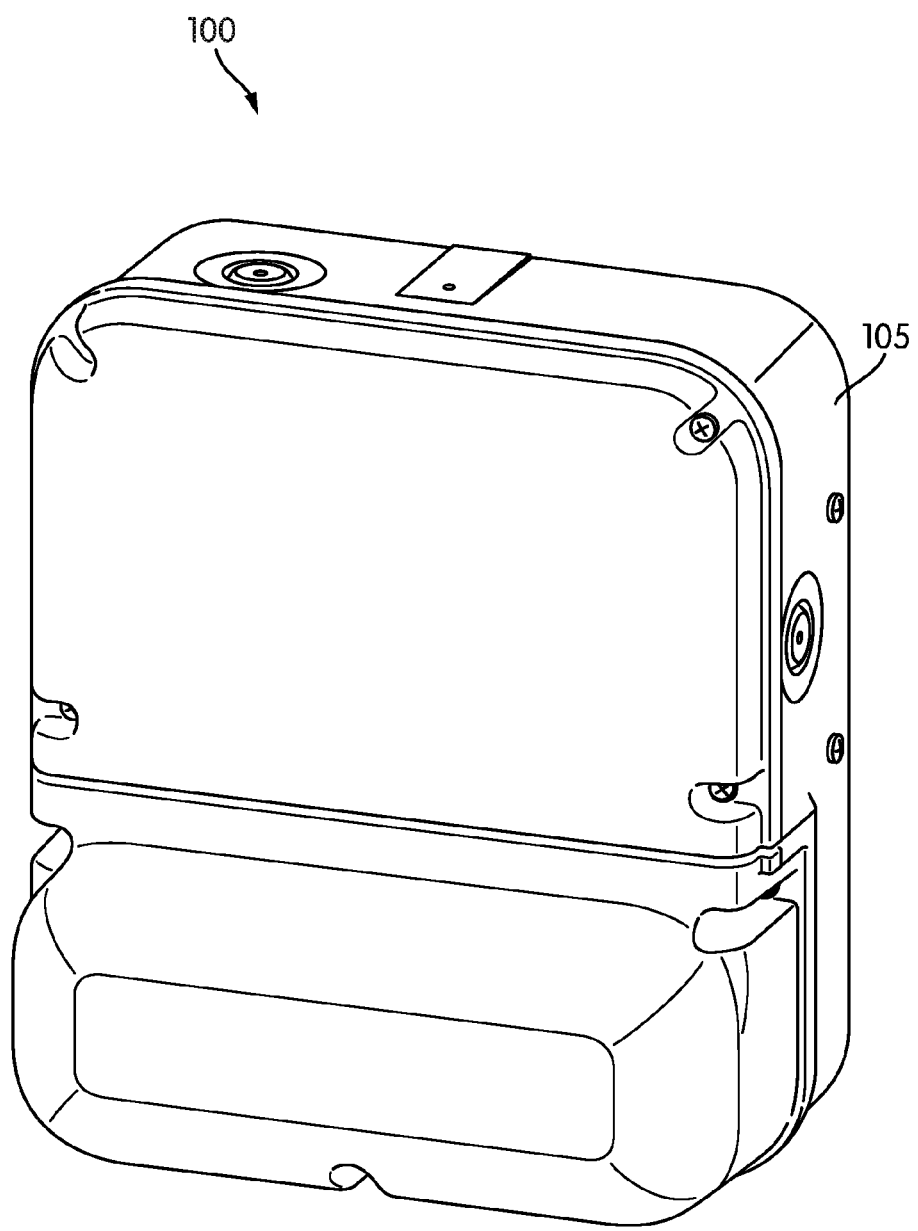
FIG. 2 is a rear perspective view of the emergency lighting unit of FIG. 1.

FIGS. 1 and 2 illustrate an emergency lighting unit or product 100 according to an embodiment of the application. The emergency lighting unit includes a housing 105 made from, for example, a flame-rated UV stable thermoplastic material. The emergency lighting unit 100 also includes a first lamp head 110 and a second lamp head 115. In some embodiments, the first lamp head 110 and the second lamp head include one or more LEDs. In other embodiments, the first lamp head 110 and the second lamp head 115 include incandescent or fluorescent light sources.

Figure 3:
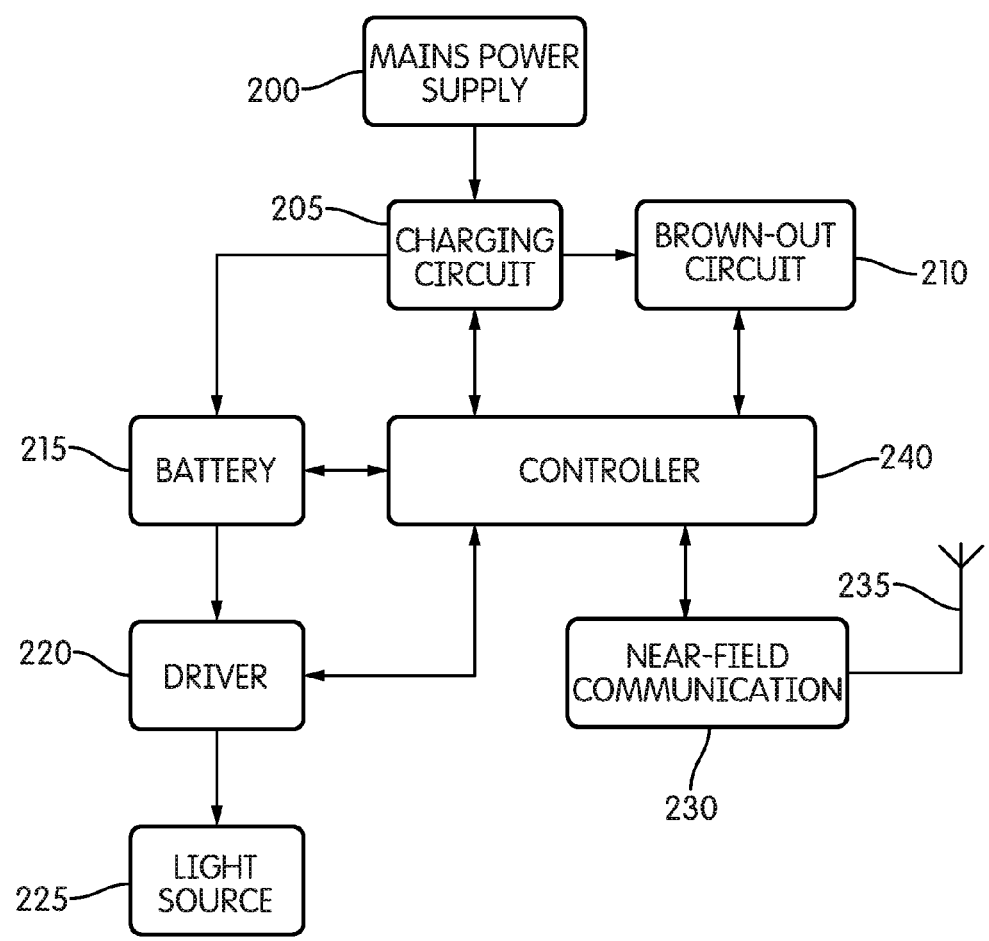
FIG. 3 is a modular schematic view of an emergency lighting unit according to an embodiment of the application.

FIG. 3 illustrates a modular schematic of the emergency lighting unit 100. The emergency lighting unit 100 includes a mains power supply module 200, a charging circuit module 205, a brown-out circuit module 210, a battery module 215, a driver (e.g., LED driver) module 220, a light source module (e.g., LEDs, lamps, etc.) 225, an NFC module 230, an antenna 235, and a controller 240. The modular schematic illustrated in FIG. 3 has been simplified for illustrative purposes and additional connections among or between various modules within the emergency lighting unit 100 can be present beyond those illustrated in FIG. 3. For example, the mains power supply module 200 can provide power directly to each of the modules within the emergency lighting unit 100, rather than through one or more modules of the emergency lighting unit 100.

The mains power supply module 200 receives power from an AC mains power supply that provides, for example, an AC voltage of between approximately 100 VAC and 305 VAC (e.g., between 120 VAC and 277 VAC). The mains power supply module 200 is operable to rectify the AC input voltage and generate a DC output voltage that can be used to power the emergency lighting unit 100. In some embodiments, the mains power supply module 200 is implemented using a flyback topology that incorporates a flyback transformer, as described below. The charging circuit module 205 receives power from the mains power supply module 200 and provides charging current to the battery module 215. The brown-out circuit module 210 is connected to mains power supply module 200 through the charging circuit module 205 and extracts input voltage information related to the voltage level of the mains power supply. The battery module 215 includes one or more batteries and provides auxiliary power to the light source module 225 when mains power is unavailable (e.g., the unit is in an emergency or brown-out condition). In some embodiments, the batteries or battery cells have a lithium-based chemistry (e.g., lithium iron phosphate ["LiFePO"]). The voltage of the batteries in the battery module 215 can also be monitored by the controller 240 to determine when the batteries need to be charged by the charging circuit module 205. The driver module 220 generates drive signals for the light source module 225. For example, the driver module 220 generates drive signals for one or more LEDs within the light source module 225 based on specified or determined levels for the output currents provided to the LEDs, a dimming level, fade-in times, fade-out times, etc. The light source module 225 includes one or more light sources that are driven by drive signals received from the driver module 220. The light sources are, for example, one or more LEDs, one or more incandescent light sources, one or more fluorescent light sources, etc. The NFC module 230 includes a connection to the antenna 235, a connection to the controller 240, and a memory for storing operational and control parameters for the emergency lighting unit 100. In some embodiments, the NFC module 230 can include an NFC transceiver. The antenna 235 is, for example, etched onto a PCB and is operable to receive NFC signals within the 13.56 MHz ISM frequency band. In some embodiments, an inductor can be used in place of the antenna 235.

Figure 4:
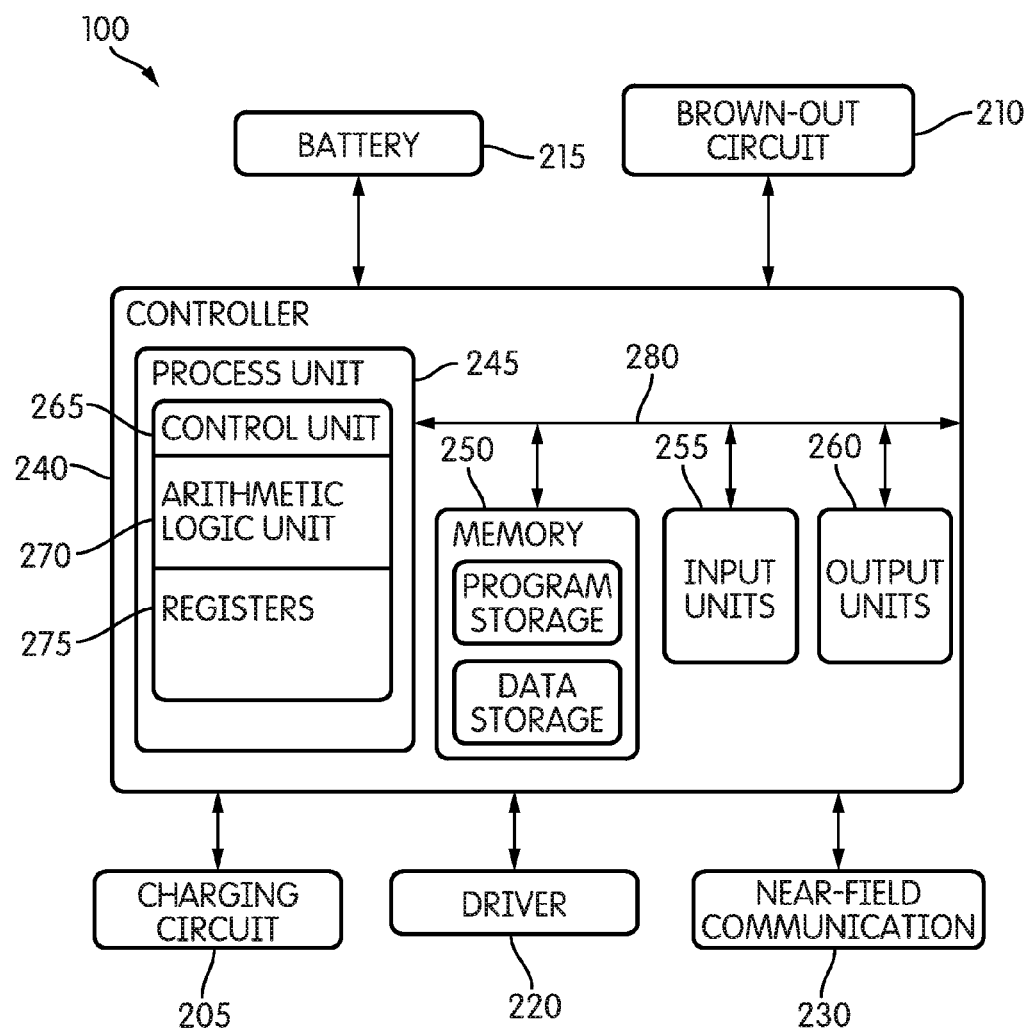
FIG. 4 illustrates a controller of an emergency lighting unit according to an embodiment of the application.

FIG. 4 illustrates the controller 240 of the emergency lighting unit 100 in more detail. The controller 240 is electrically and/or communicatively connected to a variety of modules or components of the emergency lighting unit 100. For example, the illustrated controller 240 is connected to the charging circuit module 205, the brown-out circuit module 210, the battery module 215, the driver module 220, and the NFC module 230. The controller 240 includes combinations of hardware and software that are operable to, among other things, control the charging state of the charging circuit module 205, identify a brown-out or brown-in condition, monitor the voltage of the battery module 215, control a drive level of driver module 220, receive operational and control system parameters from the NFC module, etc.

In some embodiments, the controller 240 includes a plurality of electrical and electronic components that provide power, operational control, and protection to the components and modules within the controller 240 and/or the emergency lighting unit 100. For example, the controller 240 includes, among other things, a processing unit 245 (e.g., a microprocessor or another suitable programmable device), a memory 250, input units 255, and output units 260. The processing unit 245 includes, among other things, a control unit 265, an arithmetic logic unit ("ALU") 270, and a plurality of registers 275 (shown as a group of registers in FIG. 4), and is implemented using a known computer architecture, such as a modified Harvard architecture, a von Neumann architecture, etc. The processing unit 245, the memory 250, the input units 255, and the output units 260, as well as the various modules connected to the controller 240 are connected by one or more control and/or data buses (e.g., common bus 280). The control and/or data buses 280 are shown generally in FIG. 4 for illustrative purposes. The use of one or more control and/or data buses for the interconnection between and communication among the various modules and components would be known to a person skilled in the art in view of the application described herein. In some embodiments, the controller 240 is a microcontroller, is implemented partially or entirely on a semiconductor chip, is a field-programmable gate array ("FPGA"), is an application specific integrated circuit ("ASIC"), etc.

The memory 250 includes, for example, a program storage area and a data storage area. The program storage area and the data storage area can include combinations of different types of memory, such as read-only memory ("ROM"), random access memory ("RAM") (e.g., dynamic RAM ["DRAM"], synchronous DRAM ["SDRAM"], etc.), electrically erasable programmable read-only memory ("EEPROM"), flash memory, a hard disk, an SD card, or other suitable magnetic, optical, physical, or electronic memory devices or structures. The processing unit 245 is connected to the memory 250 and executes software instructions that are capable of being stored in a RAM of the memory 250 (e.g., during execution), a ROM of the memory 250 (e.g., on a generally permanent basis), or another non-transitory computer readable medium such as another memory or a disc. Software included in the implementation of the emergency lighting unit 100 can be stored in the memory 250 of the controller 240. The software includes, for example, firmware, one or more applications, program data, filters, rules, one or more program modules, and other executable instructions. The controller 240 is configured to retrieve from memory 250 and execute, among other things, instructions related to the control processes, methods, and communication protocols described herein. In other constructions, the controller 240 includes additional, fewer, or different components.

Figure 5:
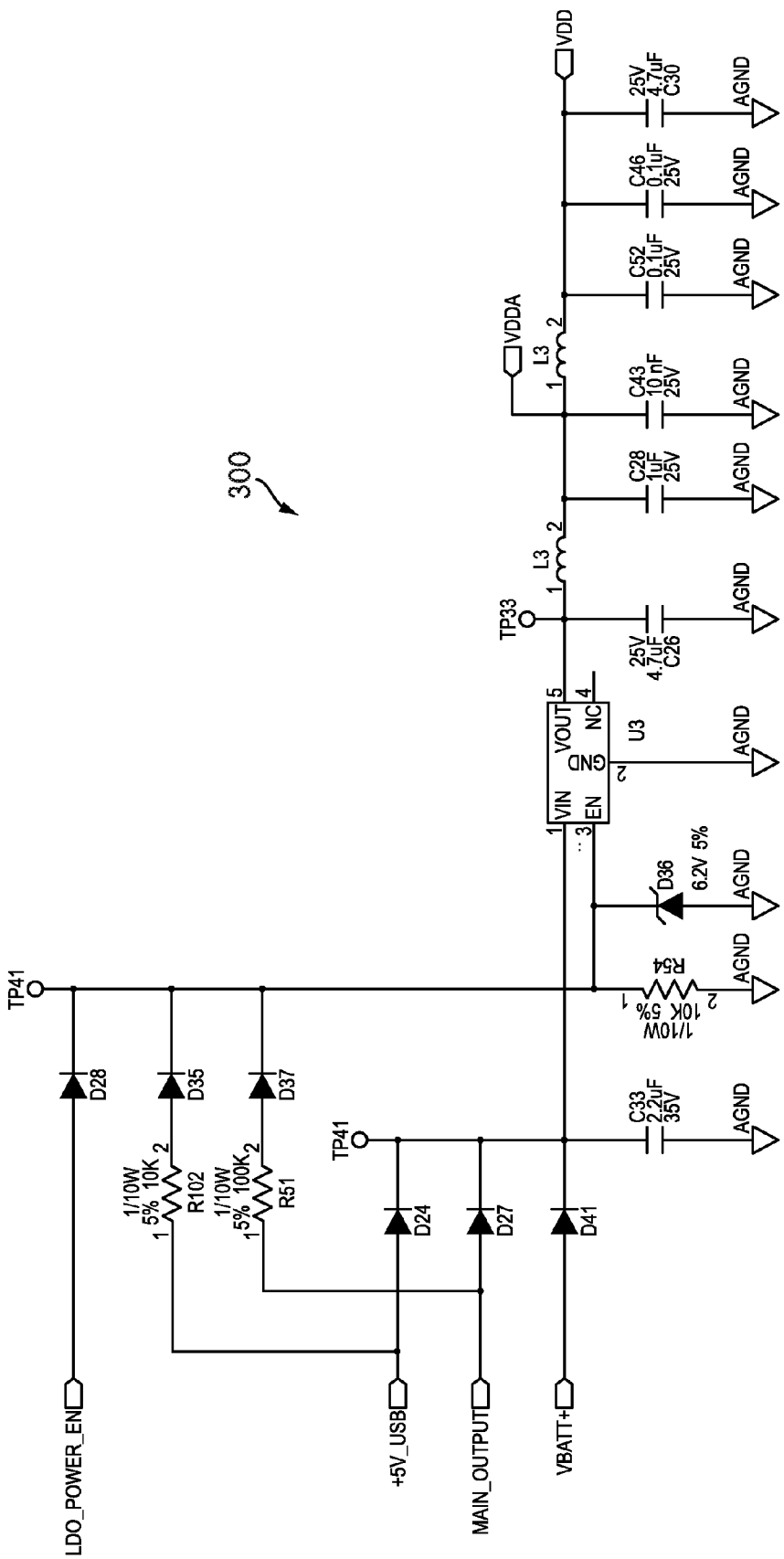
FIG. 5 illustrates an input power stage circuit module for a controller of an emergency lighting unit according to an embodiment of the application.
Figures 6, 7:
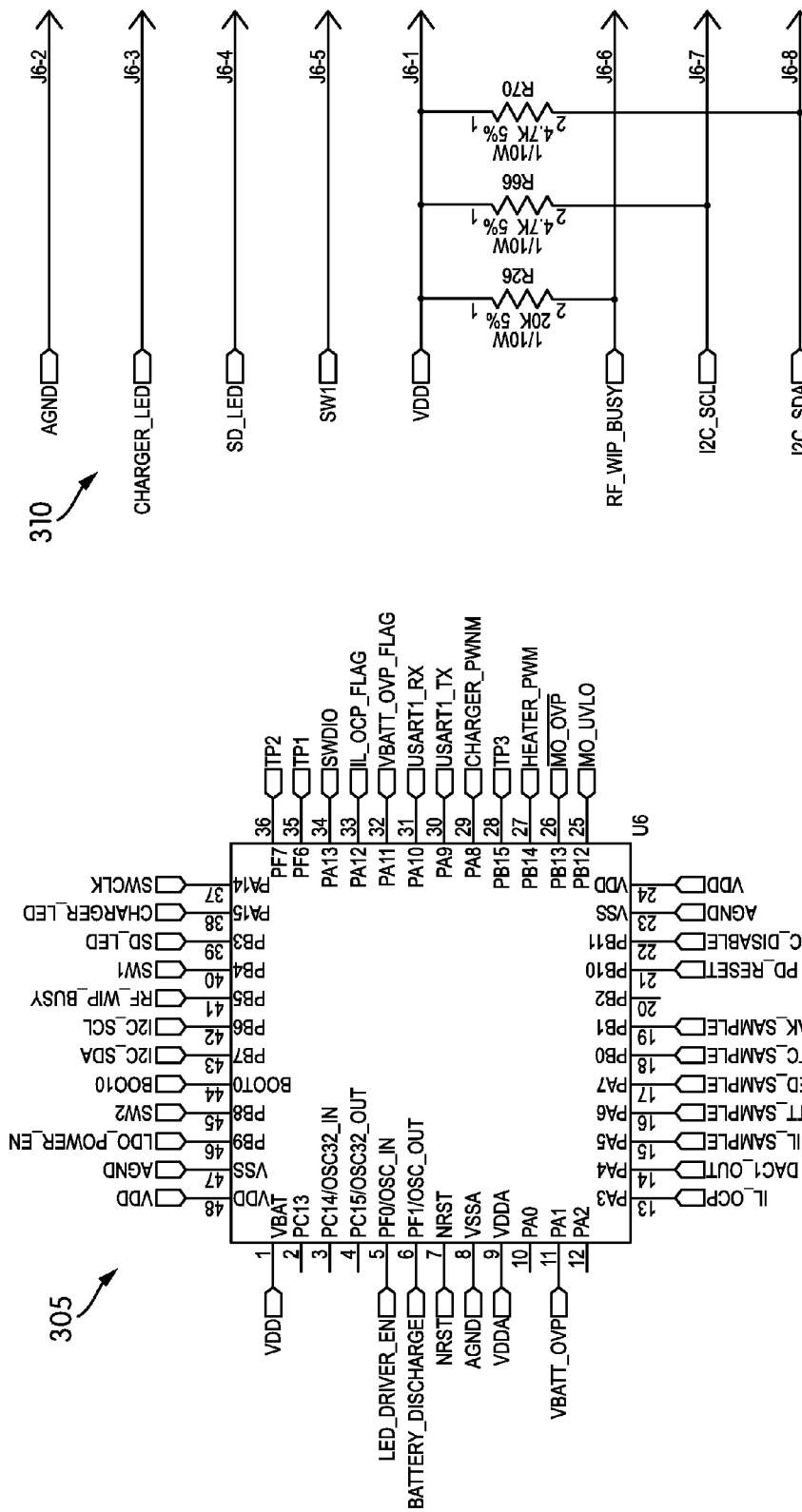
FIG. 6 illustrates a controller for an emergency lighting unit according to an embodiment of the application.
FIG. 7 illustrates an interface of a motherboard of an emergency lighting product to a daughter board of the emergency lighting unit according to an embodiment of the application.
Figure 8:
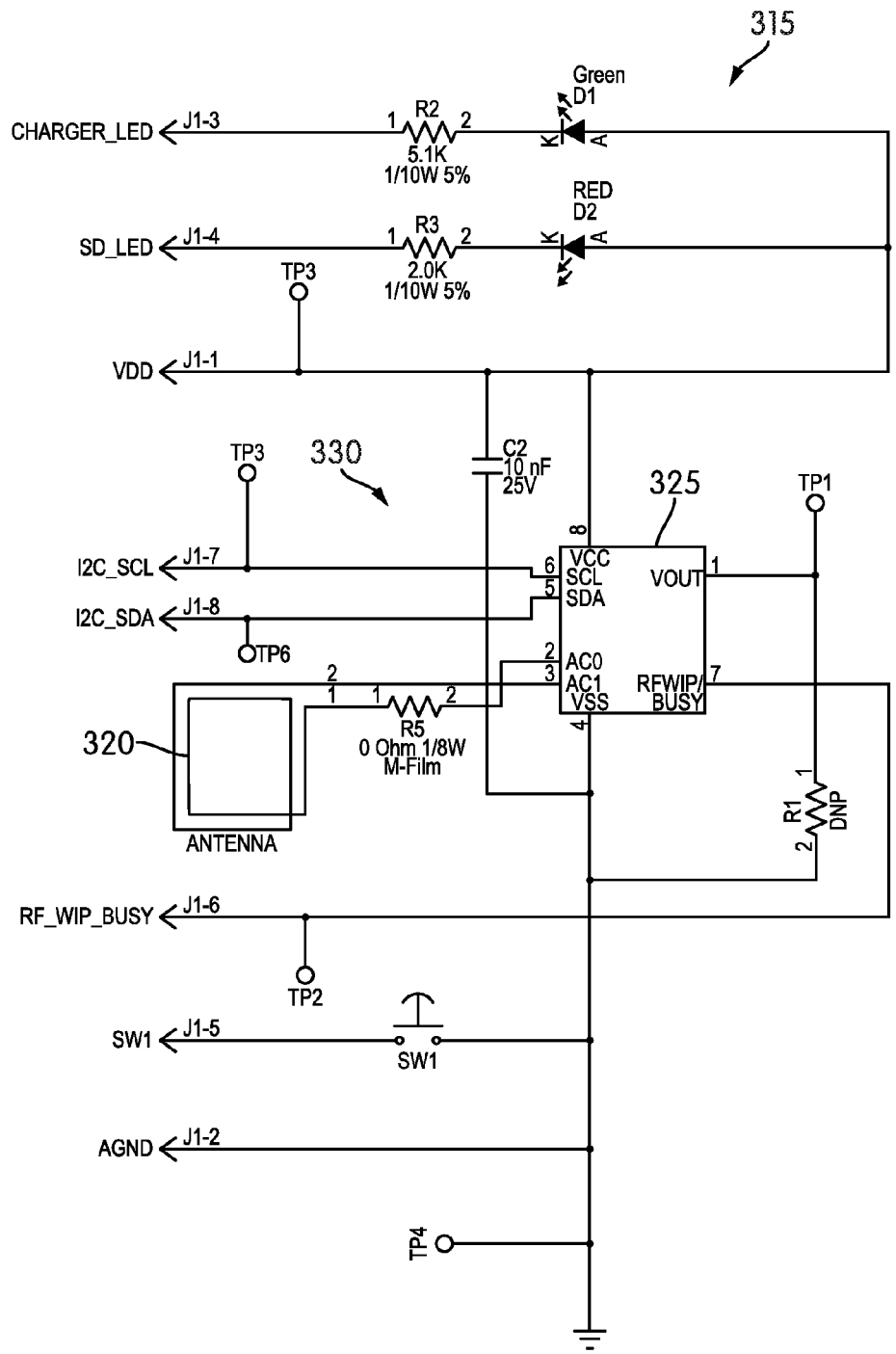
FIG. 8 illustrates a near-field communication ("NFC") circuit module and an antenna for an emergency lighting unit according to an embodiment of the application.

FIG. 5 illustrates an input power stage circuit module 300 for a controller 305 of the emergency lighting unit 100 according to an embodiment of the application. The input power stage circuit module 300 regulates an input DC voltage to provide a stable DC output voltage (e.g., 3.3 V) to the controller 305. The output voltage, VDD, of the input power stage circuit module 300 is provided as an input voltage to the controller 305 as illustrated in FIG. 6. The controller 305 is substantially similar to the controller 240 described with respect to FIG. 4. The controller 305 and the input power stage circuit module 300 are located on a primary or main PCB. The controller 305 is interfaced with a secondary or daughter PCB using an interface 310, illustrated in FIG. 7. The interface 310 connects the controller 305 to an NFC circuit module 315 illustrated in FIG. 8. In some embodiments, the interface 310 is a ribbon cable. In other embodiments, the controller 305 and the NFC circuit module 315 are located on the same PCB and the interface 310 includes a plurality of circuit traces on the PCB (e.g., instead of a ribbon cable).

The NFC circuit module 315 includes an antenna 320, an EEPROM 325, and an interface 330 (e.g., a two-wire interface, an I2C interface, etc.) connecting the EEPROM 325 to the controller 305 (e.g., via the SCL and SDA inputs to the controller 305). A passive implementation, such as that illustrated in FIG. 8, includes an antenna capable of receiving signals over the 13.56 MHz ISM frequency band. The controller 305 does not need to be powered for the EEPROM 325 to receive the operational and control system parameters for the emergency lighting unit 100, which reduces the complexity of configuring the emergency lighting unit 100. Power can be harvested from the RF signals received using the antenna 320 to power the read/write operations of the EEPROM 325. In other embodiments, an NFC interface can be used in place of the EEPROM 325. In such embodiments, the NFC interface must communicate with the controller 305 to coordinate read/write operations. Requiring communication between the NFC interface and the controller 305 requires that the controller 305 be powered when receiving operational and control system parameters for the emergency lighting unit 100. Embodiments of the application described herein are described with respect to a passive implementation of the NFC circuit module 315.

When the emergency lighting unit 100 is being manufactured, the set of operational and control system parameters corresponding to a particular implementation of the emergency lighting unit 100 is programmed into the EEPROM 325 through the antenna 320. The EEPROM 325 can be programmed without having to power up the controller 305 of the emergency lighting unit 100, and can also be completed without having to remove the emergency lighting unit 100 from its packaging.

When the emergency lighting unit 100 is deployed, the controller 305 is powered up and the controller 305 reads the system parameters from the EEPROM 325 through the interface 330. The controller 305 then sets/resets or programs the operational and control system parameters to the specified values for the particular emergency lighting unit. The operational and control system parameters that can be communicated to the emergency lighting unit using the NFC circuit module 315 include, for example, battery charge parameters, light source driver parameters, self-diagnostic parameters, self-test schedules (e.g., perform a self-test once per month, etc.), battery heater options, thresholds for brown-in and brown-out conditions, electronic product label information, product number, etc. Values for some or each of these parameters are loaded into the EEPROM 325 of the emergency lighting unit.

Battery charge parameters that can be set/reset using the NFC circuit module 315 include battery charging current, battery low-voltage discharge cutoff (e.g., which can initiate charging), battery high-voltage charging cutoff voltage (e.g., which terminates charging), battery low temperature limit (e.g., battery must be at minimum temperature before charging is initiated), battery high temperature limit (e.g., charging is interrupted or terminated in the event of an over-temperature condition), etc. The battery charge parameters can also include battery charge profiles (e.g., pulsed charging profiles, constant-current constant-voltage ["CC/CV"] charging profiles, etc.). Light source driver parameters include driver output current (e.g., to control intensity, dimming level, etc.), fade-in time, fade-out time, time at nominal current level, dimming profiles, etc. The thresholds for brown-in and brown-out conditions correspond to the circumstances under which a brown-out condition is entered (e.g., a low AC input voltage) and when brown-in condition is entered (e.g., AC input voltage has recovered). In some embodiments, the brown-out condition can include two or more settings, such as one setting for a 120 VAC mains power source and one setting for a 277 VAC mains power source. In some embodiments, the brown-in condition can include two or more settings, such as one setting for a 120 VAC mains power source and one setting for a 277 VAC mains power source. Self-diagnostic parameters include battery low-voltage cutoff, minimum LED forward voltage, LED string nominal/dimming voltage, and parameters of additional fault conditions.

When a self-test diagnostic fault condition is identified, a specific LED blinking pattern can be used to indicate the fault to a user. The battery low-voltage cutoff can correspond to a variety of low-voltage conditions. For example, a battery voltage level can be compared to a one-minute test, a 30 minute test, a 60 minute test, and a 90 minute test. If the battery voltage is insufficient to pass the one-minute test, the battery voltage is sufficiently low that the battery could not power the emergency lighting unit 100 for one minute during the emergency mode. Similar comparisons are performed for the 30, 60, and 90 minute tests to assess how long the battery would be able to power the emergency lighting unit 100.

The self-test diagnostic fault conditions also include a battery disconnect fault (e.g., battery disconnected from emergency lighting unit), a battery fault (e.g., battery capacity or battery voltage too low), a charger fault (e.g., bulk charge voltage exceeds +/−10% of desired voltage for too great of a period [e.g., 15+ hours]), an LED driver fault (e.g., LED string voltage at or near zero volts), a lamp fault, and a load learn fault. Identifying the lamp fault includes enabling the driver module and monitoring an LED string voltage when operating normally. The LED string voltage is continuously monitored and, if the LED string voltage is outside of a desired voltage range (e.g., +/− one LED voltage), the lamp fault is triggered. The load learn fault is related to the emergency lighting unit being unable to determine or learn a proper or normal load for the emergency lighting unit (e.g., LED string voltage). If the emergency lighting unit improperly learns the expected load, the emergency lighting unit may improperly enter a fault condition. The load learn fault can be triggered as the result of a communication error while writing to the EEPROM 325, when an LED string voltage is too low (e.g., at or near zero volts), the battery voltage is too low, etc.

Battery heater parameters include enabling or disabling the battery heater, setting an AC mode heater profile, setting an emergency mode heater profile, etc. The AC mode heater profile causes a battery to be heated to, for example, 25° C. The temperature can be selectively set to any desired value (e.g., less than 25° C.). The emergency mode heater profile causes a battery to be heated to, for example, between 10° C. and 20° C. The temperature can also be selectively set to another value (e.g., less than 10° C.). The temperature setting during emergency mode is generally lower than the temperature setting during AC mode to conserve battery power for illuminating the emergency lighting unit's light sources.

As described above, the EEPROM 325 receives operational and control system parameters through the antenna 320 and, when the controller 305 is powered, the controller 305 reads the stored operational and control system parameters from the EEPROM 325 into the controller 305 and updates, sets, or programs corresponding operational and control system parameters accordingly. Once the controller has been programmed or configured, the controller 305 is able to operate the emergency lighting unit 100. The controller 305 is connected to a variety of modules and sub-modules within the emergency lighting unit 100 (e.g., see FIG. 3). The operation of the emergency lighting unit 100 is further described with respect to FIGS. 9-10, which schematically illustrate various sub-circuit modules within the emergency lighting unit 100. These sub-circuit modules are connected to the controller 305 to either provide signals to the controller 305, receive signals from the controller 305, or both provide and receive signals to/from the controller 305. As a result, the controller 305 is operable to either directly or indirectly control the operation of the sub-circuit modules within the emergency lighting unit 100.

Figure 9:
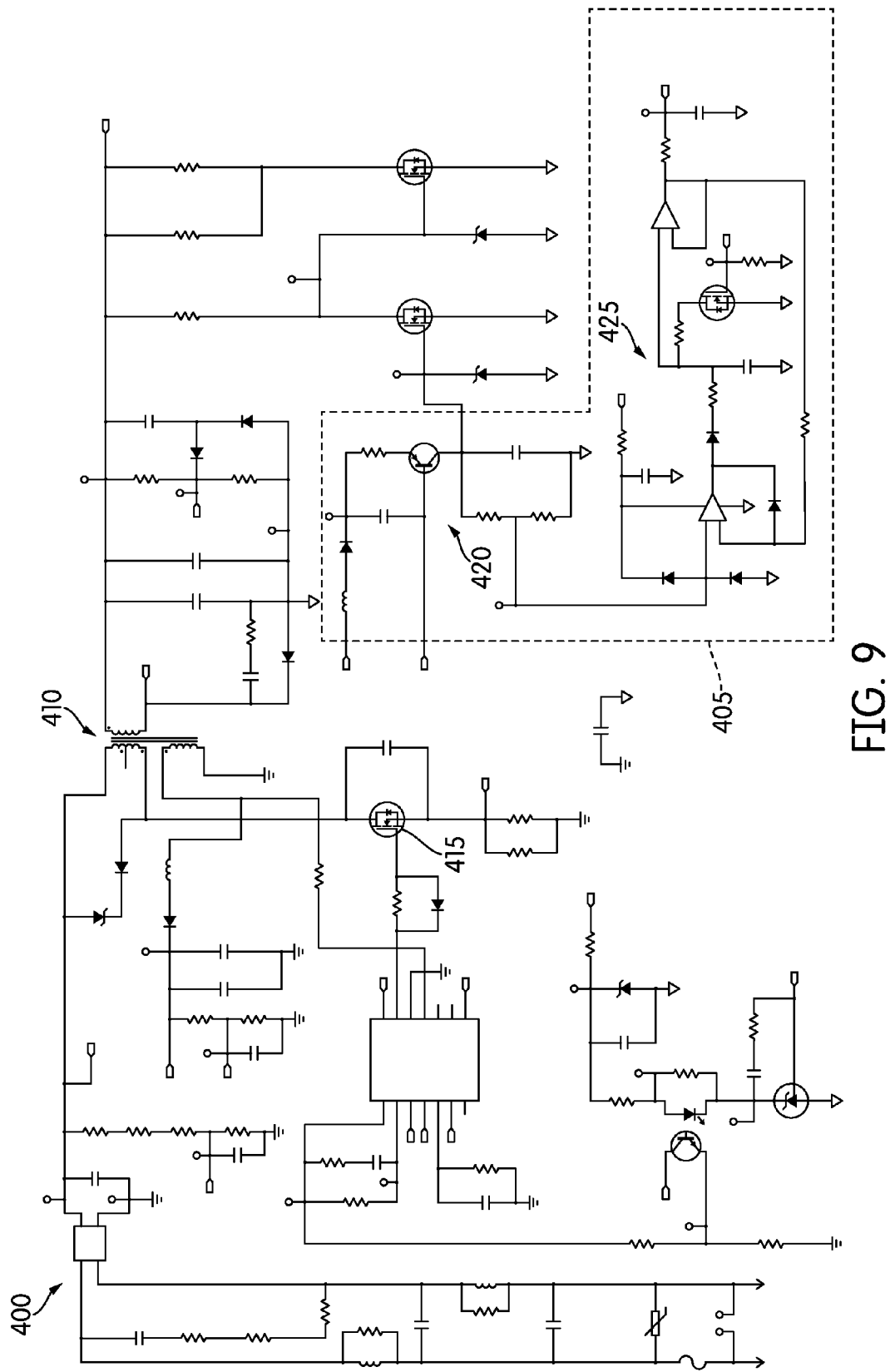
FIG. 9 illustrates a mains power supply circuit module and brown-out circuit module according to an embodiment of the application.

FIG. 9 illustrates a mains power supply circuit module 400 and a brown-out circuit module 405. The mains power supply circuit module 400 utilizes a simplified offline flyback circuit topology. The mains voltage ranges from approximately 102 VAC to 305 VAC and is applied to inputs AC1, AC2. The AC input voltage is rectified and filtered before being provided to a transformer 410. The transformer 410 includes a primary coil, a secondary coil, and a switching MOSFET 415. In a typical flyback topology converter, the flyback transformer is not used as a traditional transformer to transmit energy from the primary side to the secondary side in real time. Instead, the flyback transformer 410 is used to store energy. The output of the mains power supply circuit module, MAIN_OUTPUT, is used to power various portions of the emergency lighting unit 100.

The brown-out module 405 is operable to determine if the mains voltage drops below a threshold value, or recovers to exceed the threshold value. In some embodiments, the brown-out module 405 takes advantage of the flyback topology of the power supply and extracts input voltage information using the existing flyback power stage components. The brown-out module 405 scales the voltage down to a DC voltage that is proportional to the mains voltage level. The DC voltage can then be sampled by the controller 305 to monitor the real-time mains voltage and detect brown-out events. The brown-out module 405 is connected across the secondary coil of the transformer 410. The brown-out module 405 includes a level shifter 420 that is followed is followed by a peak detector 425. The output of the peak detector, VLINE_PEAK_SAMPLE, is provided to the controller 305 to monitor for the occurrence of a brown-out or brown-in condition.

Figure 10:
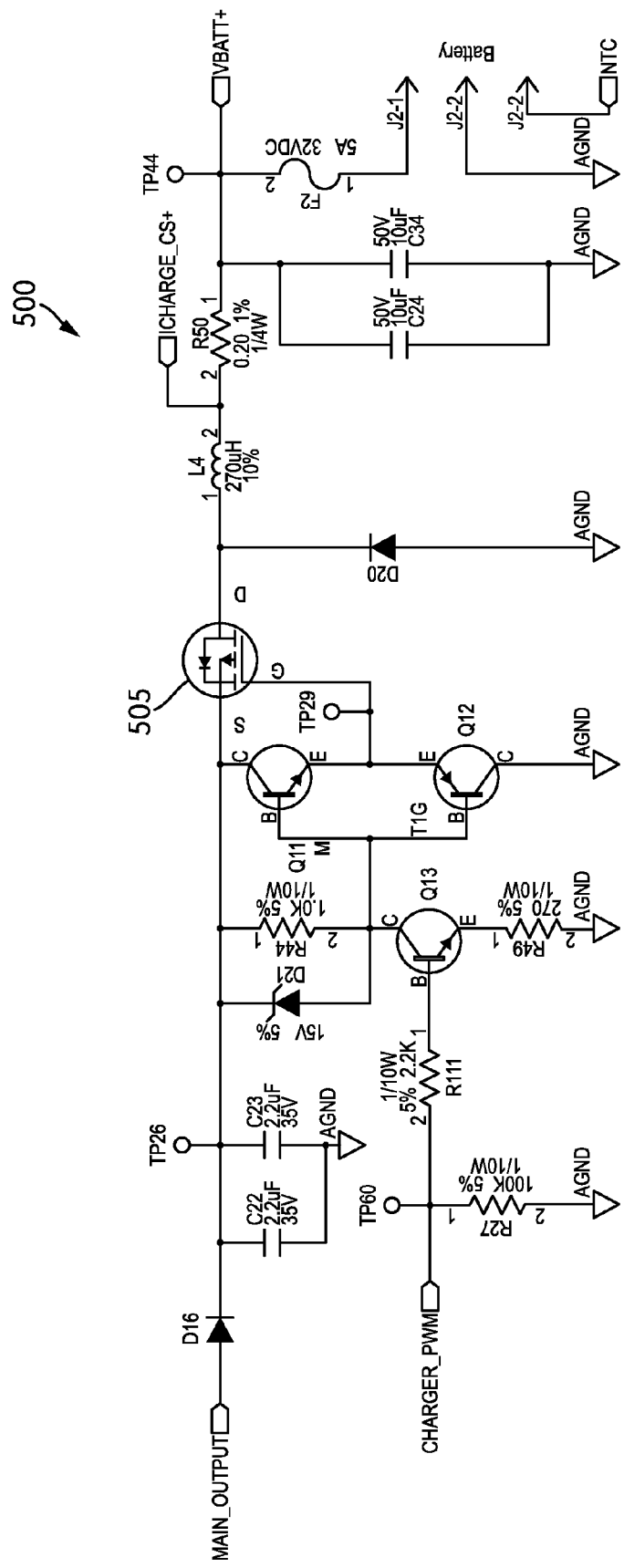
FIG. 10 illustrates a battery charger power stage circuit module according to an embodiment of the application.

FIG. 10 illustrates a battery charger power stage circuit module 500. The circuit module 500 receives power from the main output of the mains power supply circuit module 400 and provides charging current to the positive terminal, VBATT+, of the battery. The circuit module 500 receives a charger PWM signal from the controller 305 The charger PWM signal is operable to control the conductive state of a charging switch 505 to produce a desired charging current.

Figure 11:
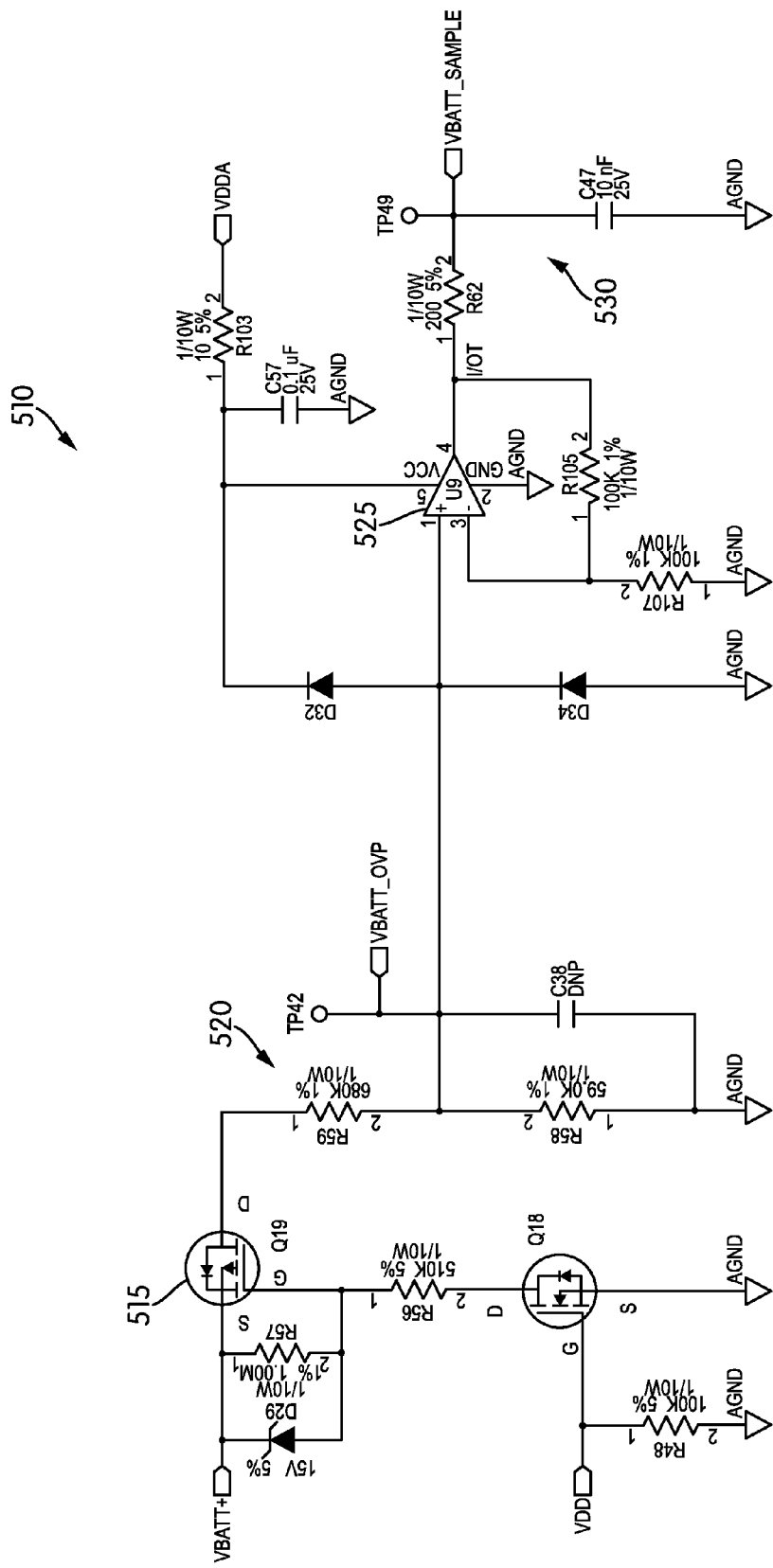
FIG. 11 illustrates a battery charger battery voltage detection circuit module according to an embodiment of the application.

FIG. 11 illustrates a battery charger battery voltage detection circuit module 510. The voltage detection circuit module 510 monitors the voltage of the positive terminal, VBATT+, of the battery. The voltage of the battery, VBATT+, is provided through a switch 515 to a voltage divider circuit 520 and a non-inverting amplifier 525. The output of the amplifier 525 is filtered by a low-pass RC filter 530 and a sampled battery voltage, VBATT_SAMPLE, is provided to the controller 305.

Figure 12:
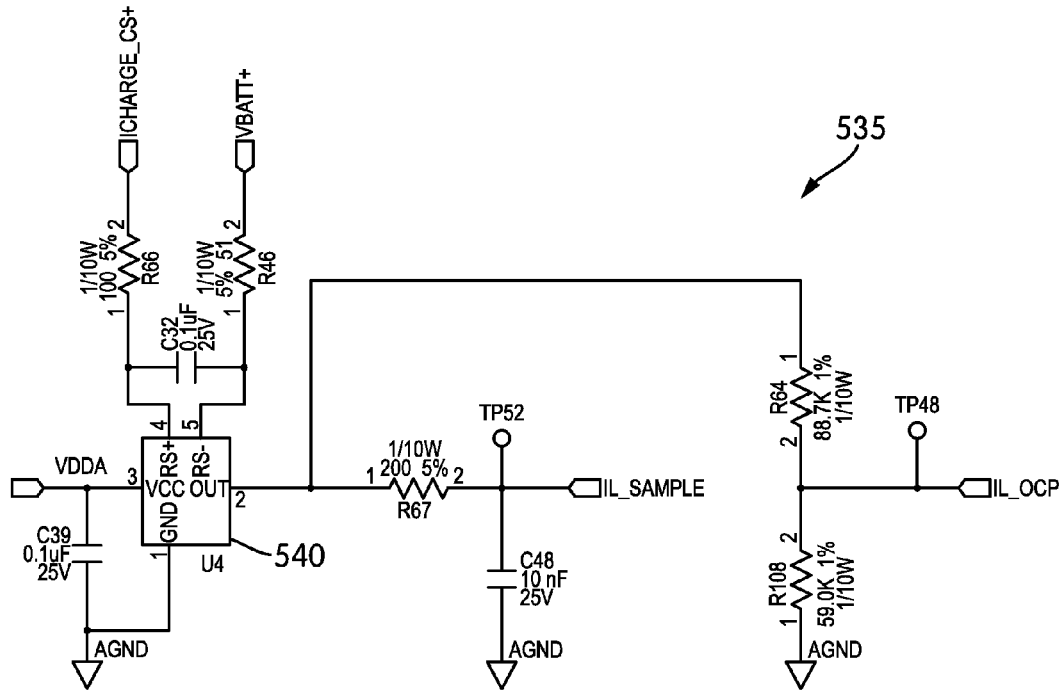
FIG. 12 illustrates a battery charger charge current sensing circuit module according to an embodiment of the application.

FIG. 12 illustrates a battery charger charge current sensing circuit module 535. The charge current sensing circuit module 535 measures a charge current that is provided to the battery. The charge current is measured across a resistor, R50 (see FIG. 10), by measuring the voltage across the resistor, R50. The voltage is provided to a current sensing integrated circuit 540, which provides a sampled current value to the controller 305.

Figure 13:
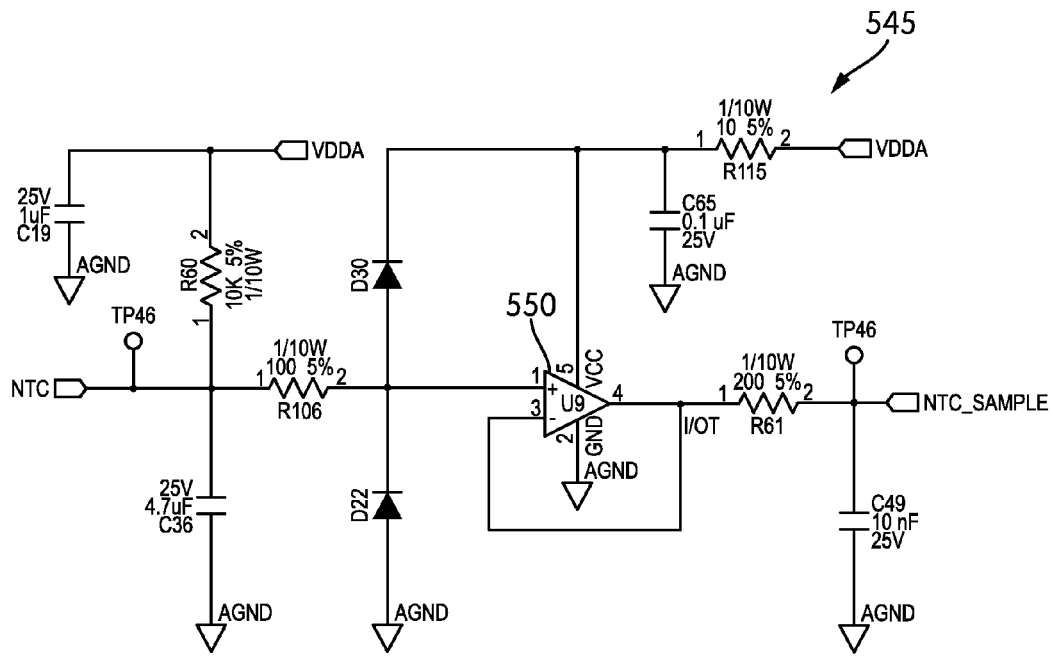
FIG. 13 illustrates a battery charger battery temperature sensing circuit module according to an embodiment of the application.

FIG. 13 illustrates a battery charger battery temperature sensing circuit module 545. The temperature sensing circuit module 545 measures the temperature of the battery to determine whether the battery is at an appropriate temperature for charging (e.g., not too cold or too hot). The temperature of the battery can be determined using a negative temperature coefficient ("NTC") resistor. The voltage of the temperature sensor is provided to a unity buffer amplifier 550, and a voltage indicative of the temperature of the battery, NTC_SAMPLE, is provided to the controller 305.

Figure 14:
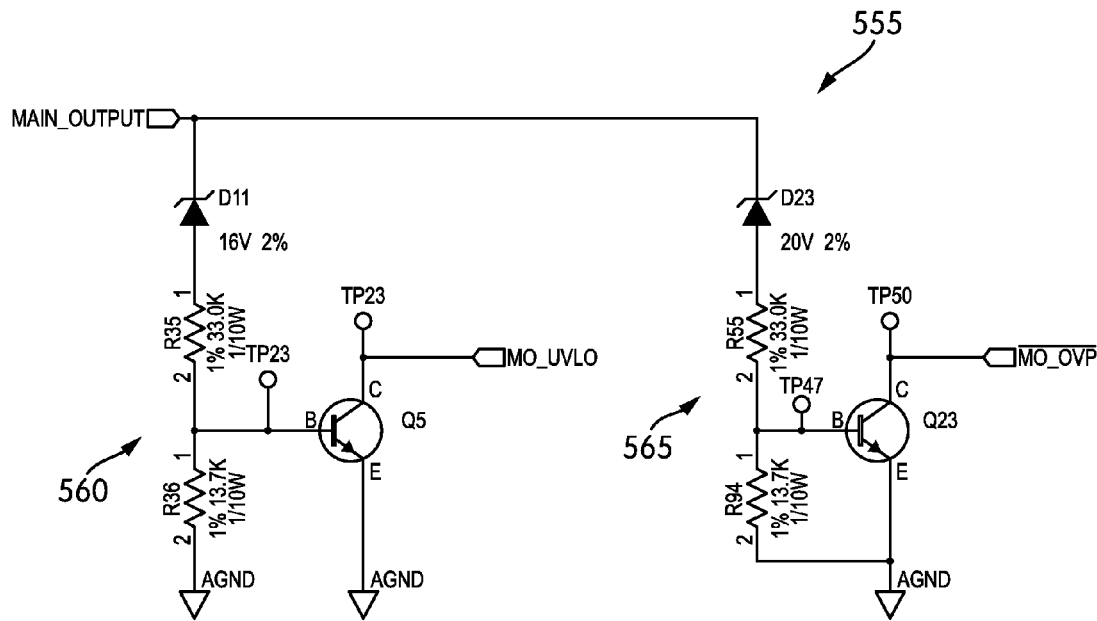
FIG. 14 illustrates a battery charger input voltage qualification circuit module according to an embodiment of the application.

FIG. 14 illustrates a battery charger voltage qualification circuit module 555. The circuit module 555 receives power from the main output of the mains power supply circuit module 400. Two voltage divider circuits 560 and 565 are implemented so the controller 305 can determine whether an under-voltage condition exists (monitored by the controller as MO_UVLO) or an over-voltage condition exists (monitored by the controller as MO_OVP).

Figure 15:
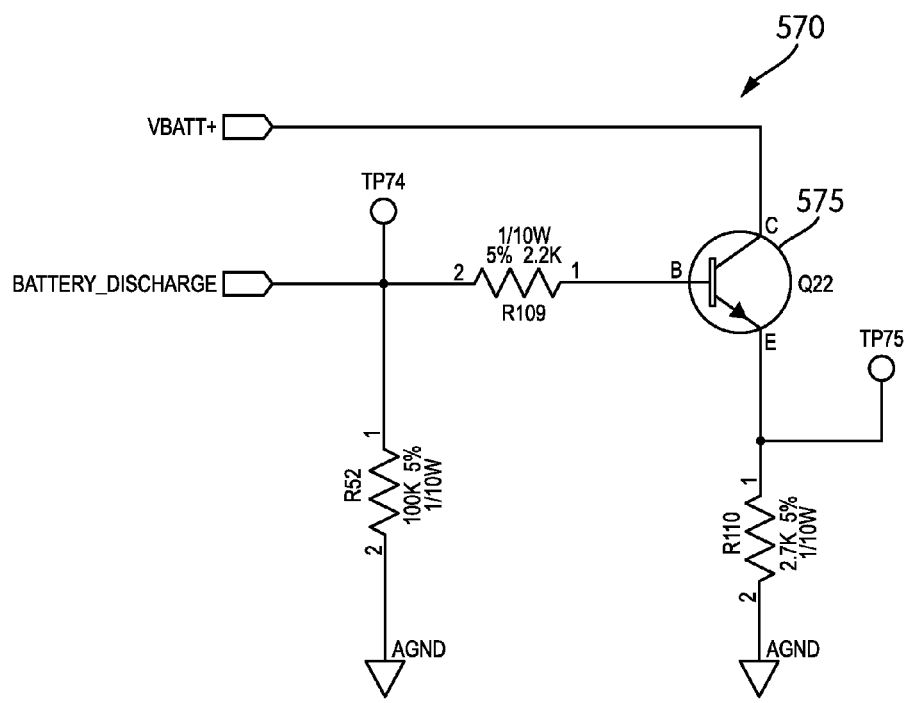
FIG. 15 illustrates a battery charger battery presence circuit module according to an embodiment of the application.

FIG. 15 illustrates a battery charge battery presence circuit module 570. The circuit module 570 is operable as a constant current sink that can be used to detect the presence of a battery in the emergency lighting unit 100. The controller 305 provides a battery discharge signal, BATTERY_DISCHARGE, to the gate of a transistor 575 to create a conductive path from the battery, VBATT+, to ground.

Figure 16:
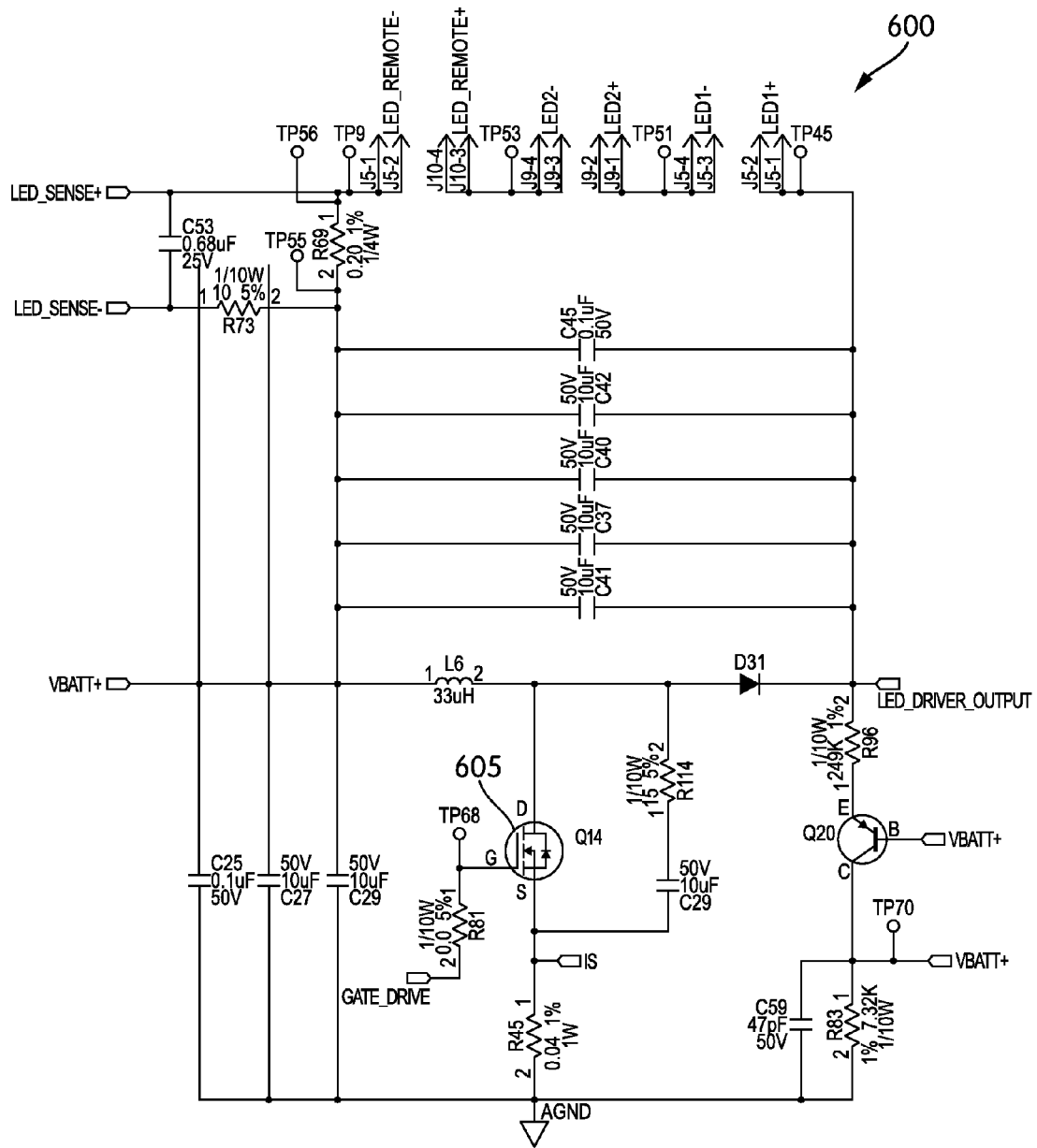
FIG. 16 illustrates an LED power stage switching circuit module according to an embodiment of the application.

FIG. 16 illustrates an LED power stage switching circuit module 600. The circuit module 600 receives power from the battery, VBATT+, and provides an LED drive voltage, LED_DRIVER_OUTPUT, for driving the LEDs when the emergency lighting unit is in the emergency mode. The circuit module 600 is used to measure the current through the LEDs using the LED_SENSE+ and LED_SENSE− voltage taps. The current that is provided to the LEDs is controlled by controlling a main drive switch 605 using the GATE_DRIVE signal from the controller 305.

Figure 17:
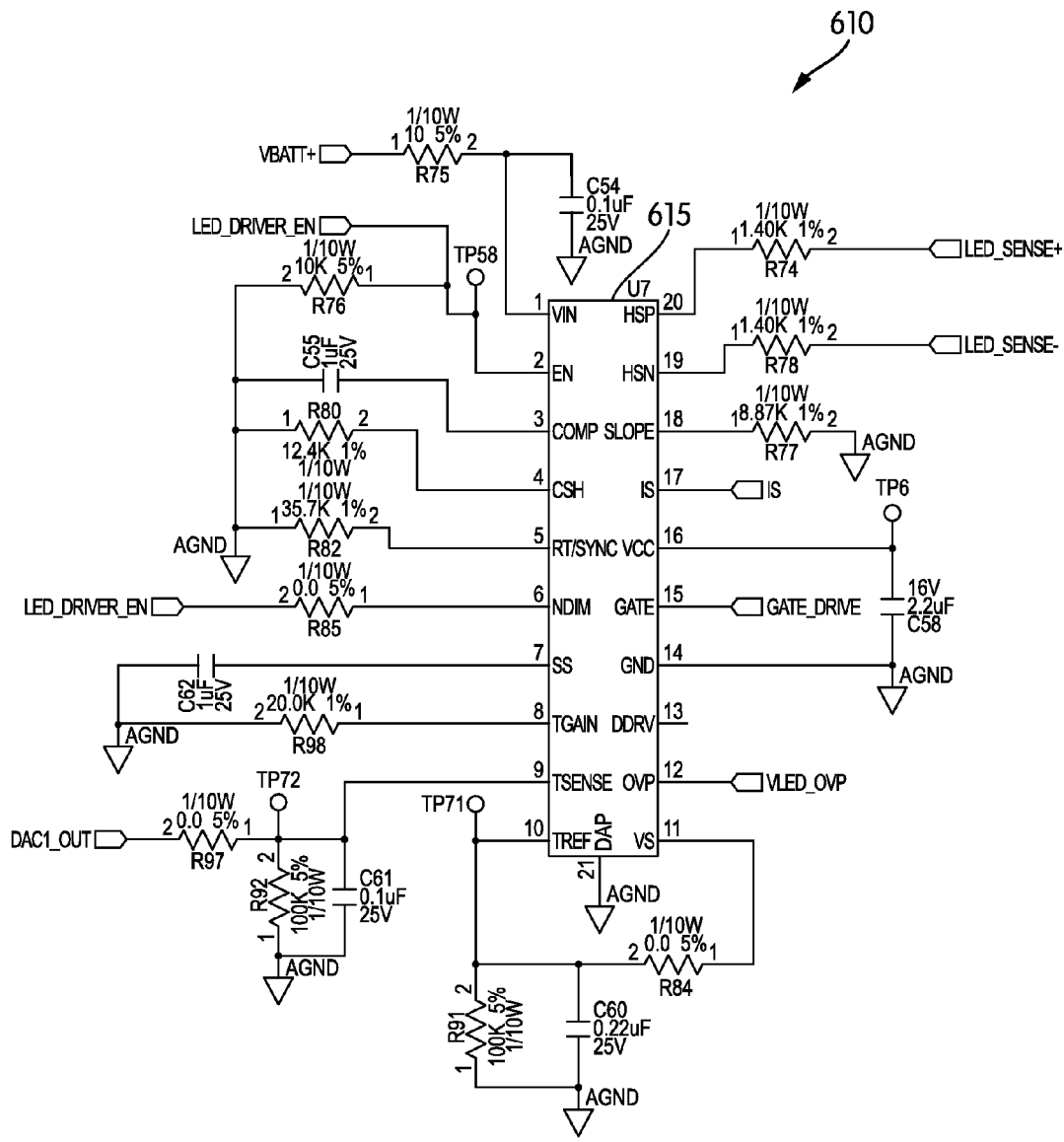
FIG. 17 illustrates an LED driver integrated circuit module according to an embodiment of the application.

FIG. 17 illustrates an LED driver IC module 610. The IC module 610 controls the circuit module 600 of FIG. 16. The IC module 610 includes an LED driver IC 615 having analog dimming interface, NDIM, that enables setting output constant current by providing a reference voltage that is proportional to the desired output current. The output current is then controlled by the GATE_DRIVE signal from the IC 615 as described above with respect to FIG. 16.

Figure 18:
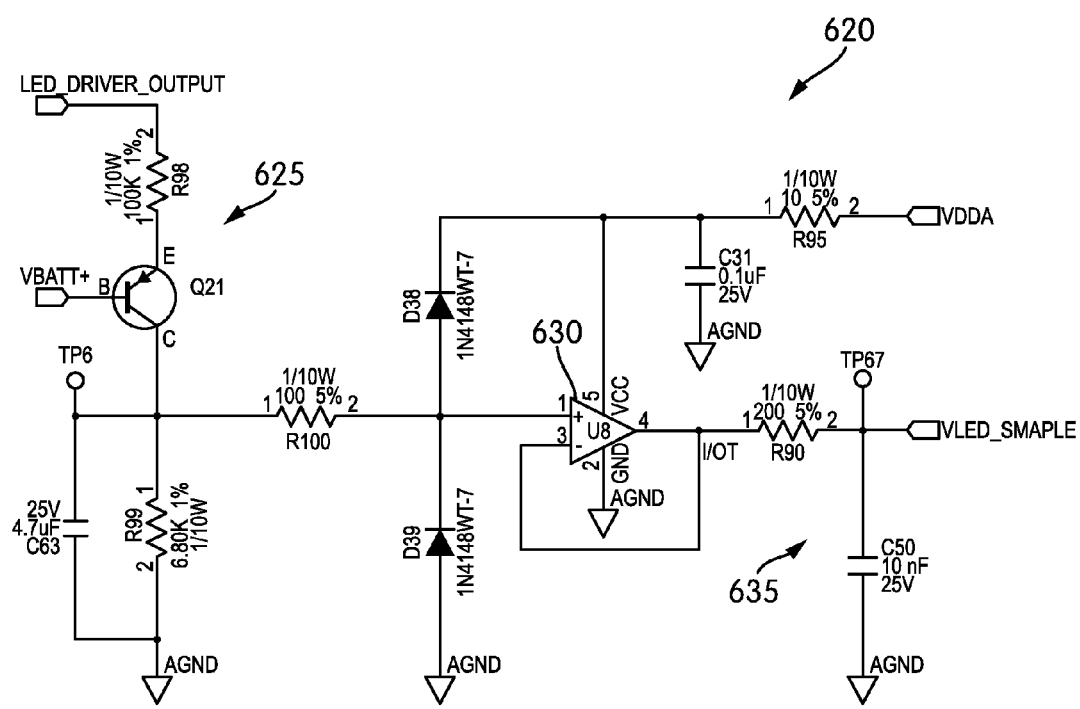
FIG. 18 illustrates an LED string voltage detection circuit module according to an embodiment of the application.

FIG. 18 illustrates an LED string voltage detection circuit module 620 for monitoring the voltage of the LEDs. The LED_DRIVER_OUTPUT voltage is provided from the LED power stage switching circuit module 600 to the LED string voltage detection module 620. The voltage of the LEDS, LED_DRIVER_OUTPUT, is provided to a voltage divider circuit 625 and a non-inverting amplifier 630. The output of the amplifier 630 is filtered by a low-pass RC filter 635 and a sampled battery voltage, VLED_SAMPLE, is provided to the controller 305.

Figure 19:
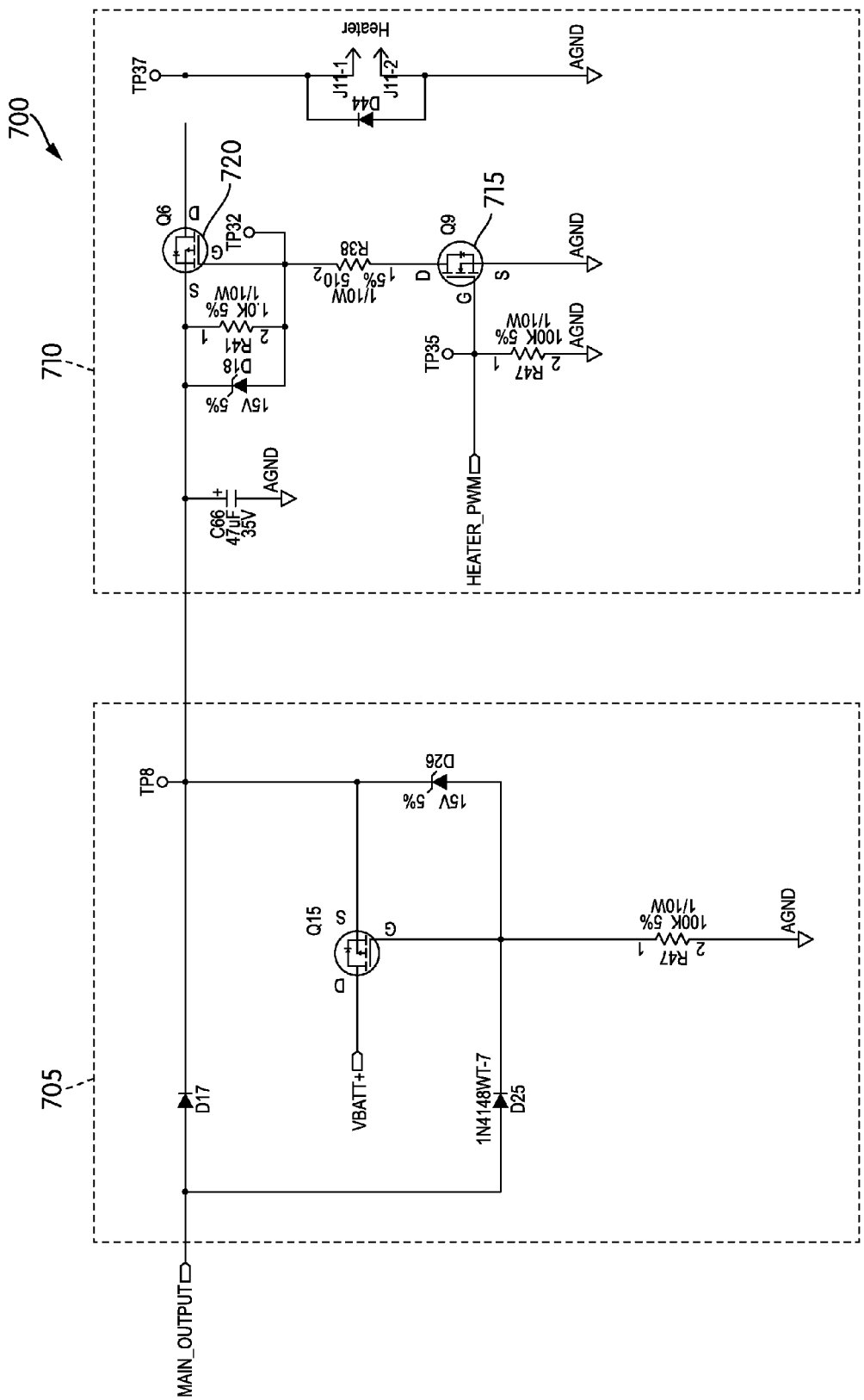
FIG. 19 illustrates a battery heater circuit module according to an embodiment of the application.

FIG. 19 illustrates a battery heater circuit module 700 that includes a power path selection module 705 and a heater ON/OFF module 710. The power path selection module 705 receives power from the main output of the mains power supply circuit module 400 or from the battery, VBATT+, depending upon the operational mode of the emergency lighting unit 100. When operating off of AC power, power to the heater is provided by the main output of the mains power supply circuit module 400. When the emergency lighting unit is in an emergency mode, power is provided from the battery. The power signal that is provided to the actual heater is controlled by an output of the controller 305, HEATER_PWM, which controls the conductive state of switches 715 and 720 to selectively supply current to the heater.

Thus, the application provides, among other things, an emergency lighting unit that includes a near-field communication module for receiving one or more operational or control system parameters. Various features and advantages of the application are set forth in the following claims.

What is claimed is:

1. An emergency lighting unit comprising:
   a light source;
   an antenna operable to receive a wireless communication signal;
   a near-field communication ("NFC") module connected to the antenna, the NFC module operable to write, to a memory, information associated with the wireless communication signal;
   a controller connected to the NFC module, the controller configured to
     read the information associated with the wireless communication signal from the memory,
     set one or more system parameters of the emergency lighting unit based on the information associated with the wireless communication signal, and
     control the illumination of the light source based on at least one system parameter based on the information associated with the wireless communication signal.

2. The emergency lighting unit of claim 1, wherein the memory includes an electrically erasable programmable read-only memory ("EEPROM").

3. The emergency lighting unit of claim 1, further comprising an alternating current ("AC") power input and a battery.

4. The emergency lighting unit of claim 3, wherein the AC power input has a voltage of between approximately 100 Volts AC and 300 Volts AC.

5. The emergency lighting unit of claim 3, further comprising a charging circuit operable to receive power from the AC power input and provide a charging current to the battery.

6. The emergency lighting unit of claim 5, wherein the controller is further configured to control the charging of the battery based on at least one system parameter set based on the information associated with the wireless communication signal.

7. The emergency lighting unit of claim 5, further comprising a brown-out circuit electrically connected to the AC power input and operable to monitor a voltage of the AC power input.

8. The emergency lighting unit of claim 7, wherein the controller is further configured to control the monitoring of the voltage of the AC power input based on at least one system parameter set based on the information associated with the wireless communication signal.

9. The emergency lighting unit of claim 1, wherein the antenna is tuned to the 13.56 MHz ISM frequency band.

10. The emergency lighting unit of claim 1, wherein the information associated with the wireless communication signal includes an electronic label for the emergency lighting unit.

11. The emergency lighting unit of claim 1, wherein the information associated with the wireless communication signal includes a dimming profile for the light source.

12. The emergency lighting unit of claim 1, wherein the information associated with the wireless communication signal includes an output drive current value for the light source.

13. A method of controlling an emergency lighting unit, the method comprising:
    receiving, via a near-field communication ("NFC") module, a wireless communication signal;
    setting a system parameter of the emergency lighting unit based on information associated with the wireless communication signal; and
    controlling illumination of a light source based on the system parameter.

14. The method of claim 13, further comprising
    receiving power from an alternating-current ("AC") power input; and
    providing a charging current to a battery.

15. The method of claim 14, wherein the step of providing the charging current to the battery is based on a second system parameter of the emergency lighting unit based on information associated with the wireless communication signal.

16. The method of claim 14, further comprising monitoring the power received from the AC power input.

17. The method of claim 16, wherein the step of monitoring the power received from the AC power input is based on a third system parameter of the emergency lighting unit based on information associated with the wireless communication signal.

18. The method of claim 13, wherein the information associated with the wireless communication signal includes an electronic label for the emergency lighting unit.

19. The method of claim 13, wherein the information associated with the wireless communication signal includes a dimming profile for the light source.

20. The method of claim 13, wherein the information associated with the wireless communication signal includes an output drive current value for the light source.

* * * * *